(12) United States Patent
Giehrl et al.

(10) Patent No.: US 7,761,271 B2
(45) Date of Patent: Jul. 20, 2010

(54) METHOD, DEVICE AND SYSTEM FOR DISPLAYING DATA OF A MACHINE CONTROL SYSTEM

(75) Inventors: Robert Giehrl, Wiesent (DE); Stefan Ramsauer, Regensburg (DE)

(73) Assignee: Krones AG, Neutraubling (DE)

( * ) Notice: Subject to any disclaimer, the term of this patent is extended or adjusted under 35 U.S.C. 154(b) by 616 days.

(21) Appl. No.: 10/526,161

(22) PCT Filed: Aug. 21, 2003

(86) PCT No.: PCT/EP03/09261

§ 371 (c)(1),
(2), (4) Date: Aug. 8, 2005

(87) PCT Pub. No.: WO2004/025383

PCT Pub. Date: Mar. 25, 2004

(65) Prior Publication Data

US 2006/0149397 A1 Jul. 6, 2006

(30) Foreign Application Priority Data

Aug. 29, 2002 (DE) .................... 102 39 638

(51) Int. Cl.
*G06F 17/50* (2006.01)
*G05B 15/00* (2006.01)

(52) U.S. Cl. .............. 703/13; 703/14; 716/1; 716/4; 700/83

(58) Field of Classification Search ........... 700/83; 703/13, 14; 716/1, 4

See application file for complete search history.

(56) References Cited

U.S. PATENT DOCUMENTS

| 4,588,950 | A | * | 5/1986 | Henley ............ 324/752 |
| 4,805,089 | A | * | 2/1989 | Lane et al. ......... 700/83 |
| 5,220,512 | A | * | 6/1993 | Watkins et al. ....... 716/11 |
| 5,230,061 | A | * | 7/1993 | Welch ............ 706/46 |
| 5,448,147 | A | * | 9/1995 | Kasai ........... 318/568.17 |
| 5,481,484 | A | * | 1/1996 | Ogawa et al. ....... 703/14 |
| 5,493,508 | A | * | 2/1996 | Dangelo et al. ...... 716/5 |
| 5,675,808 | A | * | 10/1997 | Gulick et al. ....... 713/322 |
| 5,734,572 | A | * | 3/1998 | Guignet ........... 700/97 |

(Continued)

FOREIGN PATENT DOCUMENTS

DE    10154534  A2    6/2002

(Continued)

OTHER PUBLICATIONS

Dawson et al., "Computer-Aided Design of Electronic Circuits a User's Viewpoint" IEEE 1967 p. 1946-1954.*

(Continued)

*Primary Examiner*—Ramesh B Patel
*Assistant Examiner*—Thomas H Stevens
(74) *Attorney, Agent, or Firm*—Marshall, Gerstein & Borun LLP

(57) ABSTRACT

Device, method and system for displaying data of a machine control system. Status data for at least one element of the system, which represent at least one physical state variable, are received. The status data, which are received for the element, are represented in a circuit diagram which displays, at least for the element, the electrical/physical connection of the element in the system.

17 Claims, 4 Drawing Sheets

U.S. PATENT DOCUMENTS

| | | | |
|---|---|---|---|
| 5,949,994 A * | 9/1999 | Dupree et al. | 712/228 |
| 6,067,477 A | 5/2000 | Wewalaarachchi et al. | |
| 6,151,689 A * | 11/2000 | Garcia et al. | 714/49 |
| 6,556,950 B1 * | 4/2003 | Schwenke et al. | 702/183 |
| 6,823,497 B2 * | 11/2004 | Schubert et al. | 716/4 |
| 7,072,818 B1 * | 7/2006 | Beardslee et al. | 703/14 |
| 7,206,646 B2 | 4/2007 | Nixon et al. | |
| 7,356,786 B2 * | 4/2008 | Schubert et al. | 716/4 |
| 2005/0149311 A1 * | 7/2005 | McGaughy | 703/14 |

FOREIGN PATENT DOCUMENTS

| | | |
|---|---|---|
| EP | 0389132 A1 | 9/1990 |
| EP | 0563684 A2 | 10/1993 |
| EP | 0810557 A2 | 12/1997 |

OTHER PUBLICATIONS

GMCL—Software for Process Control Systems, "DBDOC—A Database Documentation System", published 1996, p. 1-107.

* cited by examiner

| Element ID (31) | Element type (32) | ... |
|---|---|---|
| 1 | Switch | |
| 2 | Control bit input | |
| 3 | Control bit output | |
| 4 | Control parameter | |
| 5 | Voltage | |
| ⋮ | | |

(30)

| Element ID | Actual value (42) | Target value (43) | Range (44) | ... |
|---|---|---|---|---|
| 1 | 1 | / | / | |
| 2 | 0 | 0 | 0-1 | |
| 3 | 1 | 0 | 0-1 | |
| 4 | 3 | 5 | 0-7 | |
| 5 | 125 | 127 | 127±5 | |

METHOD, DEVICE AND SYSTEM FOR DISPLAYING DATA OF A MACHINE CONTROL SYSTEM

FIELD OF THE DISCLOSURE

The present disclosure relates to systems, in which at least one machine is controlled, and, in particular, to a method, device and a system for displaying data of such a machine control system.

BACKGROUND OF THE DISCLOSURE

Modern production machines have to satisfy a multitude of function requirements of the greatest variety and, at the same time, they must present a high degree of flexibility. The methods used to achieve these properties include using complex machine controls. In such a system, it is often a great challenge to identify the cause of an error. For example, the error on a controlled machine can become apparent, even if it was triggered in a controlling unit of another machine located at a remote location. Therefore, specialized service and maintenance terminals are increasingly used for error analysis in complex machine control systems.

SUMMARY OF THE DISCLOSURE

Therefore, the problem of the present disclosure is to provide a method, a device and a system for displaying data of such a machine control system, which is easier to handle for the operator.

To display data of a machine control system, status data for at least one element of the system are received, according to the disclosure, which data represent at least one physical state variable. The status data which are received for the element, are displayed to the operator in a circuit diagram, which shows, at least for the element, the electrical connection of the element in the system. The operator, thus, does not have to switch back and forth between the different windows. The start-up procedure, maintenance, error search, etc., of the machine control system become substantially more efficient, because the operator gains a better overview of the system status more quickly.

According to a preferred embodiment of the method, the representation of the circuit diagram is carried out using a stored characterization for the element and connection data which are associated with a characterization. The connection data represent the electrical connection of the element in the system. By this method, a particularly high flexibility is achieved, because changes can be taken into account, for example, merely by renewing or extending the machine control system by means of updated connection data. From the updated connection data, one also obtains, for a completely new system, the associated element via the characterization. The status data can then be received and represented as described.

It is particularly advantageous in the step of the reception of the status data to carry out an identification of the elements, which are to be represented in the circuit diagram, and to receive only the status data for the identified elements. In this manner, an unnecessary transfer of status data can be avoided.

According to additional embodiments of the method according to the disclosure, corresponding target values or limit values are displayed together with the status data for the element. In this manner, it is easier for the operator to control whether a value which is displayed for a state represents an error.

In an additional embodiment of the disclosure, previous status data, which indicate at least one previous value for the state variable, are represented for the element. Thus, the operator can receive, even at a later time, a representation of the temporal variations of certain status data, for example, in a time window in front of a subdivided field.

A device according to the disclosure is adapted for carrying out one of the above methods. Thus, a system according to the disclosure is formed from such a device and the machine control system.

BRIEF DESCRIPTION OF THE DRAWINGS

The disclosure is explained in greater detail with reference to the figures, which is shown individually.

DETAILED DESCRIPTION OF THE DISCLOSURE

Figure 1:
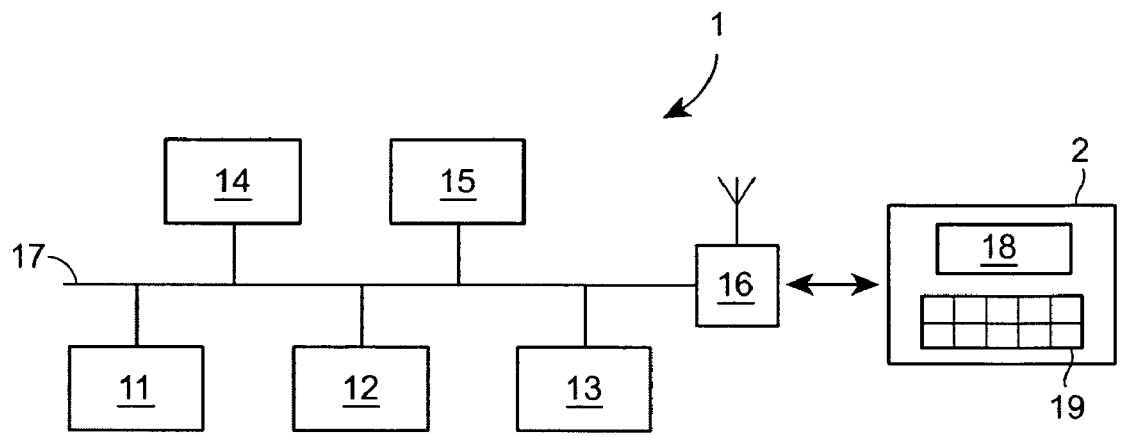
FIG. 1—a machine control system with a maintenance terminal.

The disclosure can be applied, for example, to the machine control system 1 which is shown in FIG. 1. A machine control system denotes any system by means of which at least one machine is controlled. In a concrete embodiment, the machine control system is first limited only in that status data for the components of the system or their elements must be made available or accessible. These status data represent a physical state variable of the element, in particular during the control operation in the machine control system.

FIG. 1 shows a service terminal 2, which assists a user in the error search, maintenance, startup operations, etc., in the machine control system 1. The service terminal 2 comprises a monitor 18 as well as a keyboard 19. Furthermore, it is connected by wireless connection to the machine control system 1 or by a cable through the machine's access point 16.

In the machine control system 1, various machines 11-13 are interconnected by a bus 17, where each machine can comprise its own control unit. A data server 15 makes available all the data present in the system, for example, for representation on a stationary operator terminal 14 or on the mobile service terminal 2. For the normal control operation, the state of the system 1 or the state of one of the machines 11-13 (components) is represented on the operator terminal 14 in such a manner that the system 1 can be monitored and/or controlled at the operator terminal 14.

The terminal 2 usually uses a window-based operating system, software to control the system 1, and software for the representation of image data. The operator of the terminal 2 receives, from the control software, the status of components of the system in a first window. For this purpose, data are used, which are obtained from the data server 15. In an additional window, the operator can request at least portions of a circuit diagram of the system. The circuit diagram is here stored as an image file, showing, for example, an E-CAD drawing.

On the basis of the circuit diagram, the operator verifies how the individual electronic elements of the system 1 are connected to each other. In the second window, the operator determines for which element he/she should verify next the status in the first window, for example, to localize an error in a stepwise procedure. Previously, for the analysis of an erroneous state in the system 1, the operator of the terminal 2 had to continuously switch back and forth in an iterative process between the representation of the status data and the representation of the circuit diagram.

Figure 2:
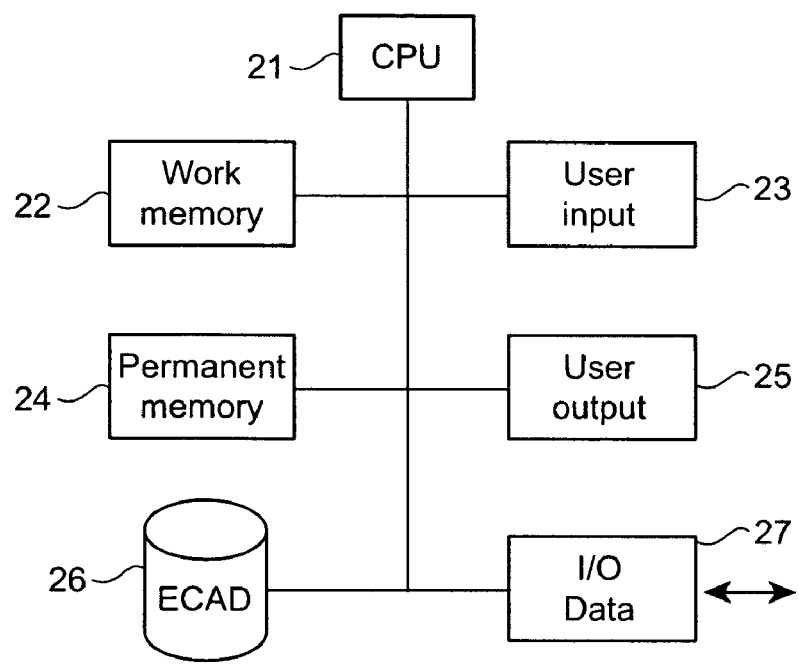
FIG. 2—a schematic representation of the units of a device according to the disclosure.

However, FIG. 2 shows functional units of a device according to the disclosure, where the device is also referred to as the end device below. Such an end device can be, for example, a mobile service or maintenance terminal. The system according to the disclosure is formed by the end device and machine control system.

The end device in FIG. 2 comprises a central processing unit (CPU) 21, a work memory 22, a permanent memory 24, a user input unit 23, a user output unit 25, a data memory 26 for storing circuit diagrams, and an interface unit 27.

The user output unit 25 comprises at least one representation unit, usually in the form of a monitor. Through the interface unit 27, the device can exchange data with a machine control system.

The end device receives, via the interface unit 27, status data for at least one element of the machine control system. The user output unit 25 represents the received status data for an operator of the end device in a circuit diagram, which, at least for the element, clarifies the electrical connection of the element in the system. The corresponding process steps are explained again below in a more detailed manner with reference to FIG. 5.

In the data memory 26 of FIG. 2, the circuit diagram is stored, preferably in the form of connection data for the elements of the machine control system. The connection data can be transferred directly from an E-CAD system or they can be converted from an E-CAD format into a standardized E-CAD format. Then, they are stored either in the standardized format or in a data format which is conventional for E-CAD systems, such as, for example, VNS, DWG, PDF or DXF.

The interface unit 27 can provide a wireless and/or hard-wired connection to the machine control system. For example, it is advantageous to receive the currently up-to-date status data by wireless reception, to make use of the mobility of the end device. The circuit diagram data or connection data for the circuit diagram of a machine control system to be maintained can be transferred immediately to the end device, and thus the end device can be used in a flexible manner. For this purpose, a connection cable which is reversibly plugged into the end device can be used, to achieve a higher transfer rate than with wireless transfer. Furthermore, it is possible to store the circuit diagram data on data media, which can be inserted into an appropriate hard drive of the end device.

The user output unit 25 can also comprise, as additional units, a loudspeaker, a printer or corresponding connections. The user input unit 23 can comprise individual keys, a keyboard, a mouse, a touch-sensitive surface or a microphone.

When the operator of the end device indicates by an entry in the user input unit 23 that he/she would like to inspect a portion or an overview of a circuit diagram, the data which have been stored for this portion in the data memory 26 are read out. The elements, which are to be represented in the portion, are identified based on the characterization. Via the data interface unit 27, the data are now requested or received for the identified elements. The status data so received are then displayed for the operator in the circuit diagram using the output unit 25.

For the status data which are represented in the circuit diagram, the operator is additionally given the possibility to change the value of these state variables in the machine control system. The operator enters, via the user input unit 23, a corresponding preset value for the state variable. The preset value is transferred to the machine control system as a value to be set and it is also set accordingly. The preset value can thus be forced as the value for the state variable of an element. The operator then observes the reaction of the machine control system to the changed state.

The permanent memory 24 stores, besides an operating system, a program, which is suitable to provide the described functionality of the end device. This program controls both the reception of the status data and also their representation in the circuit diagram.

When the circuit diagram, as in the following two embodiments, is represented with the help of image files, the end device can be simplified. The end device then no longer needs to be able to interpret the connection data, for example, in the form of E-CAD data.

For an image file, which represents portions of the circuit diagram, positions which are associated with an element have to be stored as circuit diagram data. The position indicates a relative position in the image file, which allows the end device to represent the status data on or at the element. The end device represents the image file and thus the element. Using the position which is associated with the element, the status data are represented on or at the element.

In an additional embodiment, the circuit diagram can also be constructed element by element from image files. For this purpose, an image file is associated with the element, which image file represents at least the element. As circuit diagram data, one must store the cross reference between element and associated image file, as well as data concerning the connection or arrangement of the elements. Connections between the elements can also be managed as image files. Furthermore, the positions of the image data can be stored in a given circuit diagram portion. The end device interprets the stored data, to assemble the representation of the circuit diagram from the image files. The status data are incorporated in the image file of the given element.

The circuit diagram data which are required for or together with the image data in each instance can be provided by means of an automatic converter. The converter can be arranged in the machine control system or an E-CAD system, for example, to automatically generate the currently up to date circuit diagram data and/or image files from changed E-CAD data.

Figures 3, 4, 5:
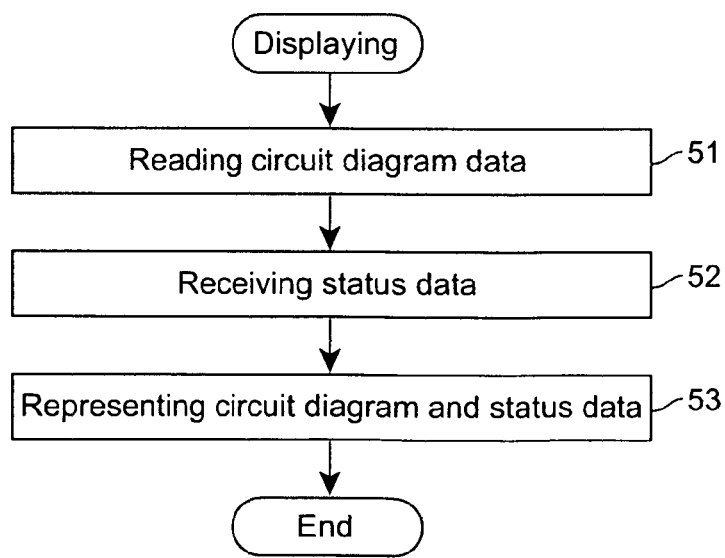
FIG. 3—a simplified representation in table form of connection data for a circuit diagram.
FIG. 4—a simplified representation in table form of status data of an element.
FIG. 5—a process diagram for a method according to the disclosure.

FIG. 5 shows a process diagram for a corresponding method for displaying data of the machine control system with steps 52 and 53. A step 51 of reading a circuit diagram data is an optional step.

In the step 52, the status data are received for at least one element of the machine control system, which status data represent at least one physical state variable. In the step 53, the received status data are represented in a circuit diagram, which indicates, at least for the element, the electrical connection of the element in the system.

In the optional step 51, the connection data are read, to identify the elements which are to be represented in the circuit diagram. By means of a characterization, which is stored for the given element, a determination is then made first to determine if any status data have to be received. As a result, in the step 52, only those status data are received, which are also to be represented subsequently in the step 53 for the operator.

The reception of status data, as a function of the machine control system, also includes the corresponding request of the status data. Previous values of a state can also be requested and received. Some errors occur only once, and at first they can no longer be reproduced at a later time, in particular as long as the trigger of the error has not been identified. Therefore, either the data server 15 or a unit, which is especially provided for this task, stores the previous status data. For example, the value of a state variable is stored in a ring buffer until an error occurs. Based on previous values, the operator can then repeat the actual development which later led to the error.

FIG. 3 shows, in a Table 30, a simplified example for connection data, where for each element, in a column 31, a corresponding element ID is indicated as characterization, and, in a column 32, an element type is indicated. The element type determines the type of the physical state variable of the element.

For the element ID 1, the element type is a switch; for the element ID 2, it is a control bit input; for the element ID 3, it is a control bit output; for the element ID 4, it is a control parameter; and for the element ID 5 it is a voltage.

Such a table does not have to be established for the elements, rather it is usually already available in an appropriate form in the E-CAD data. For the characterization of the column 31, it is preferred to make a selection which is also suitable for the identification of the element in the machine control system.

FIG. 4 shows, in the form of a table, the status data for the elements having the characterization 1-5 from FIG. 3.

A column 42 shows an actual value for the given element. In addition, in a column 43, target values for the corresponding element are indicated, or, in a column 44, a range of admissible values of the status data of the corresponding element is represented.

It is advantageous to represent at first only the actual value in the circuit diagram on or at the corresponding element. Optionally, the target and/or range values can be displayed either automatically or upon the request of the operator of the end device. Such an expanded representation can be triggered, for example, by the operator by selecting with an input unit the element which is represented in the circuit diagram.

Figure 6:
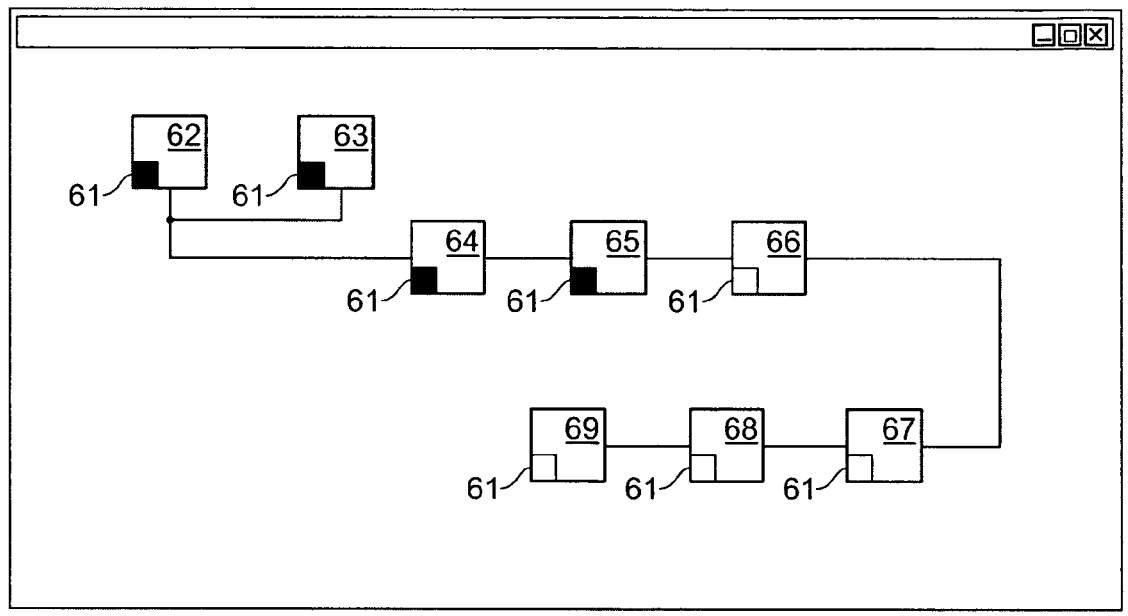
FIG. 6—a view of a window displayed on a monitor, in which status data of bus participants are represented according to the disclosure.
Figure 7:
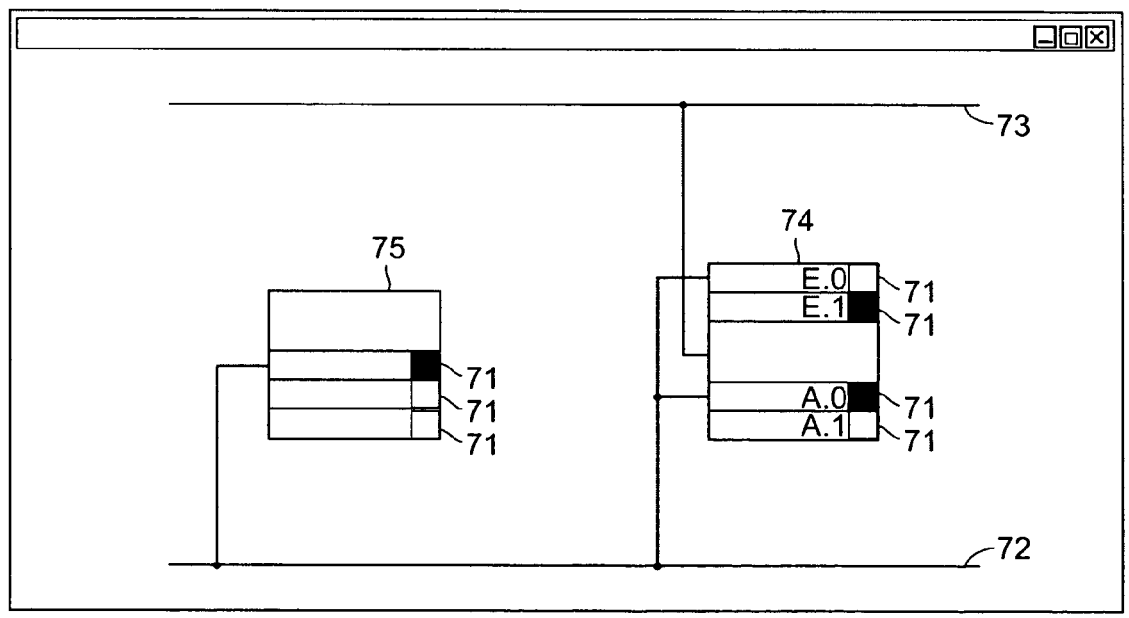
FIG. 7—a view of a window which is represented on a monitor, in which the status data for a component overview for units with several elements according to the disclosure are represented.
Figure 8:
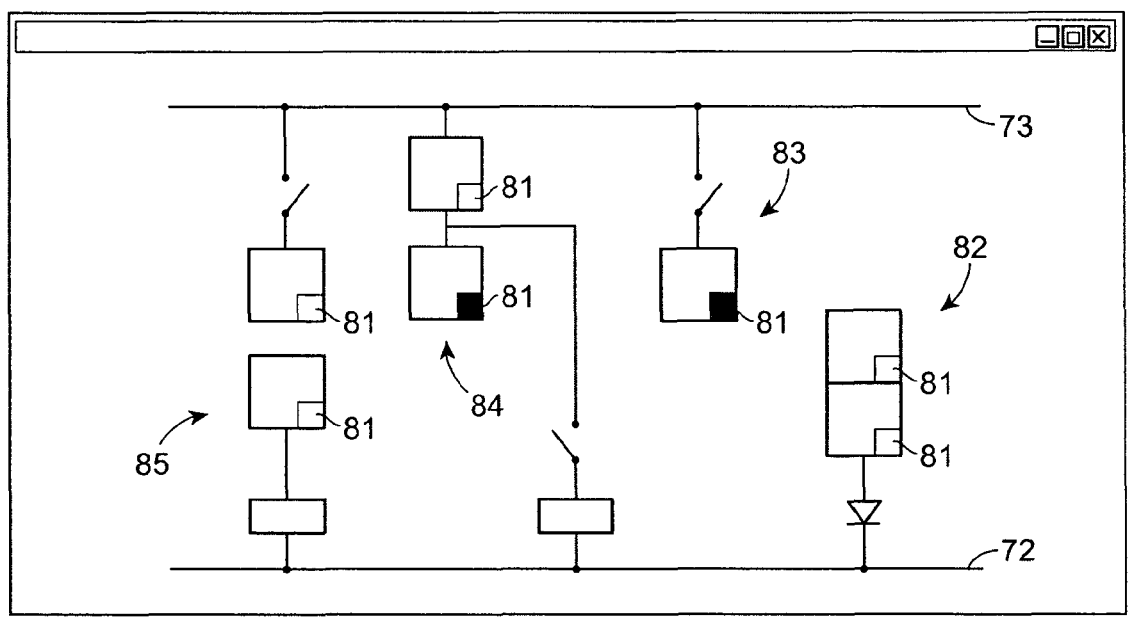
FIG. 8—a view of a window which is represented on a monitor, in which the status data for individual elements in a current wiring diagram according to the disclosure are represented.

FIGS. 6-8 show three different views that are displayed for the operator on the monitor of an end device according to the disclosure. In each case, status data are represented on or at the represented elements.

FIG. 6 represents the sequentially interconnected units 62-69 in each case with one field 61 for status data. This form of representation is particularly well suited for the verification of a signal series or of bus participants. In this example, the signal flow is shown as is passes from the key box 69, through the signal exchange unit 68, the sorting tool 67, the machine drive 66, the emergency off switch 65 and the voltage feed 64, to the power supply unit 62 and the control unit 63. Using, in each case, the associated status data, which are displayed in the field 61, one can now determine the unit in the series where the status data start indicating an error.

Using a single bit of status data, it is possible to represent, for example, the following state variables: on or off, control bit set or not set, error or no error, switch closed or not closed. As shown in the example of FIG. 6, such status data are represented simply by a corresponding white or black surface 61. In particular, one can use here signaling colors such as, for example, red and green.

Instead of a separate surface 61, one can also use the color of the completely depicted element or the background color for an element as a representation of the state of the element. Accordingly, closed switches would be shown as green and open switches as red. Consequently, one can avoid the expenses of managing the size and the position of the separate surfaces 61.

However, the representation of the status data can also be adapted to the element. For example, such an adaptation is carried out by the representation of an open or closed switch, the display of the actual value, such as an applied voltage, or a graphic representation of a deviation between the actual value and a target value.

FIG. 7 shows a hard-wired unit 74 and 75 between two lines 72 and 73. Each of these units contains a multitude of elements, for example, input control bits E.01 and E.1, and output control bits A.0 and A.1, whose status data are displayed in fields 71 in the form of a set-up diagram. A selection, to determine which status data of a larger unit should be displayed, can be limited automatically to the input and output variables or to the variables which are critical for the unit.

FIG. 8 shows a current path diagram (wiring diagram) with groups 82-85 of elements. The status data are displayed in corresponding fields 81. As already described, the fields can be marked in color. For example, if a measurement device is arranged in group 83, the value of a corresponding measurement variable is displayed instead of the field 81 or in the field 81.

Each physical or functional unit of the machine control system can be represented as element of the machine control system.

Individual advantages and characteristics of the disclosure are described in each instance with reference to only one figure. However, it is obvious that the advantages and characteristics can be combined with each other without any problem.

The expression "circuit diagram," according to the disclosure, denotes wiring diagrams, construction diagrams, bus diagrams, apparatus part lists, clamp diagrams, cable diagrams, and similar representations.

The invention claimed is:

1. Method for displaying data of a machine control system comprising:
    receiving status data for at least one element of the machine control system, which represent at least one physical state variable;
    representing the status data which have been received for the element;
    representing a circuit diagram, which displays, at least for the element, an electrical connection of the element to other individual elements in the machine control system;
    where the representation of the status data which have been received for the element occurs in the represented circuit diagram.

2. Method according to claim 1, where the representation of the circuit diagram occurs using a characterization, which has been stored for the element, and associated connection data, which represent the electrical connection of the element in the machine control system.

3. Method according to claim 2, where the characterization allows the association of the element with its status data.

4. Method according to claim 1, where the status data are displayed one of at or on the represented element in the circuit diagram.

5. Method according to claim 1, where the step of receiving the status data also comprises an identification of elements, which are to be represented in the circuit diagram, where the representation of the status data for the identified elements occurs.

6. Method according to claim 1, where, in response to user input, which establishes a preset value for the represented status data, the preset value is set as a value for a corresponding state variable in the machine control system.

7. Method according to claim 1, where corresponding target values are displayed with the status data for the element.

8. Method according to claim 1, where corresponding limit values are displayed with the status data for the element.

9. Method according to claim 1, where previous status data for the element are represented, which indicate at least one previous value for the state variable.

10. Method according to claim 2, where the step of receiving the status data also comprises an identification of elements, which are to be represented in the circuit diagram, where the representation of the status data for the identified elements occurs.

11. Method according to claim 2, where, in response user input which establishes a preset value for the represented status data, the preset value is set as a value for a corresponding state variable in the machine control system.

12. Method according to claim 11, where, in response to the user input which establishes a preset value for the represented status date, the preset value is set as a value for the corresponding state variable in the machine control system.

13. Method according to claim 2, where corresponding target values are displayed with the status data for the element.

14. Method according to claim 2, where corresponding limit values are displayed with the status data for the element.

15. Method according to claim 7, where corresponding limit values are displayed with the status data for the element.

16. Method according to claim 7, where previous status data for the element are represented which indicate at least one previous value for the state variable.

17. Method according to claim 8, where previous status data for the element are represented which indicate at least one previous value for the state variable.

* * * * *